Patented June 28, 1927.

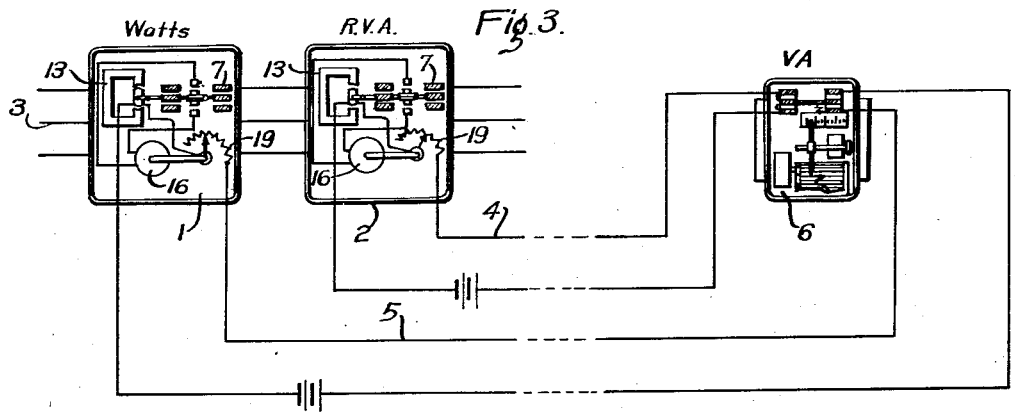

1,633,973

UNITED STATES PATENT OFFICE.

PERRY A. BORDEN, OF TORONTO, ONTARIO, CANADA.

REMOTE METERING SYSTEM.

Application filed November 22, 1924. Serial No. 751,532.

My invention relates to metering systems and particularly to apparatus for measuring the volt-amperes traversing an alternating-current circuit and for transmitting an indication of the same to a remote point.

One object of my invention is to provide means for causing currents to traverse the two sets of windings of a dynamometer type of instrument, such as a Kelvin-balance, that are proportional to the power and the reactive components of volt-amperes, respectively, in order to produce a torque upon the movable element of the instrument that is a function of volt-amperes.

Another object of my invention is to provide in connection with an alternating-current circuit, means whereby currents are caused to traverse two transmission circuits that depend upon the power and the reactive components of the volt-amperes flowing in said alternating-current circuit to operate a device in accordance with the volt-amperes traversing the alternating-current circuit.

In accordance with my invention, two measuring instruments are connected to an alternating-current circuit to measure the power and the reactive components of the volt-amperes traversing the circuit. Associated with each measuring instrument is a controlling device for producing a current of which the magnitude, frequency or other characteristic is varied in accordance with the magnitude of the power and reactive components. A volt-ampere meter is provided that is actuated by the currents proportional to the power and reactive components. A Kelvin-balance volt-ampere instrument may be used, the torque on the movable element thereof being proportional to the sum of the squares of the power and the reactive components. If the scale of the instrument is suitably calibrated, the instrument will read the square root of the sum of the squares of the power and the reactive components, or the volt-amperes flowing in the alternating-current circuit.

For a better understanding of my invention, reference may be had to the accompanying drawings, in which Fig. 1 is a front elevational view of a transmitting instrument that may be used in carrying out the invention.

Fig. 3 is a diagrammatic view of a remote metering system embodying my invention and Figs. 4 and 5 are similar views of modifications thereof.

Referring to Fig. 3, the system comprises two measuring instruments 1 and 2 that are adapted to measure the power and the reactive components of the volt-amperes traversing the associated circuit 3, and to control the currents traversing two circuits 4 and 5 in accordance with the magnitude of these components. A receiving instrument 6 of the dynamometer or Kelvin-balance type is connected to the circuits 4 and 5 to be actuated in accordance with the sum of the currents flowing in said circuits. If the instrument 6 is properly calibrated, it will indicate the square root of the sum of the squares of the power and the reactive components of the volt-amperes, which is the accepted definition of volt-amperes.

Figure 1:
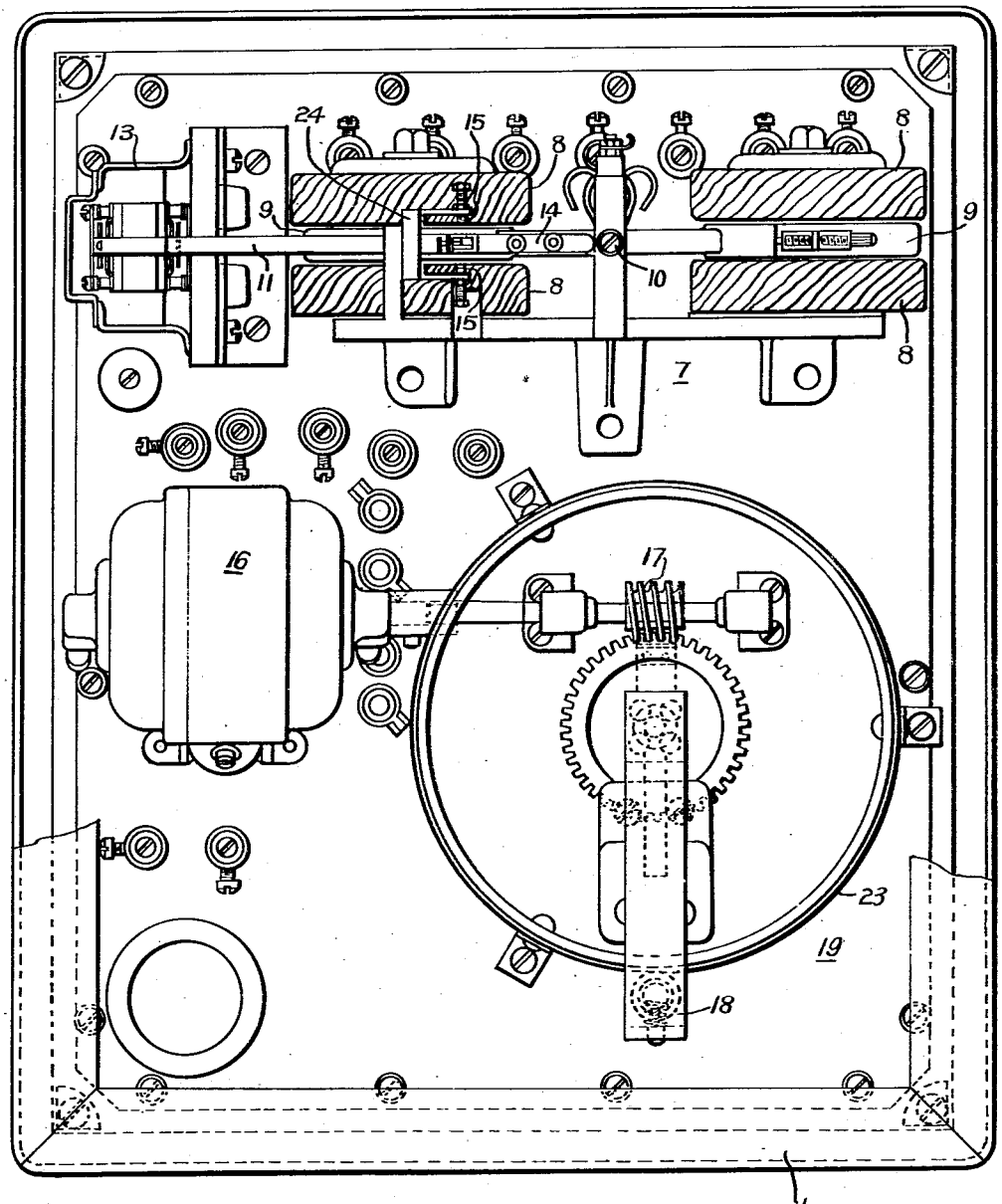
Figure 2:
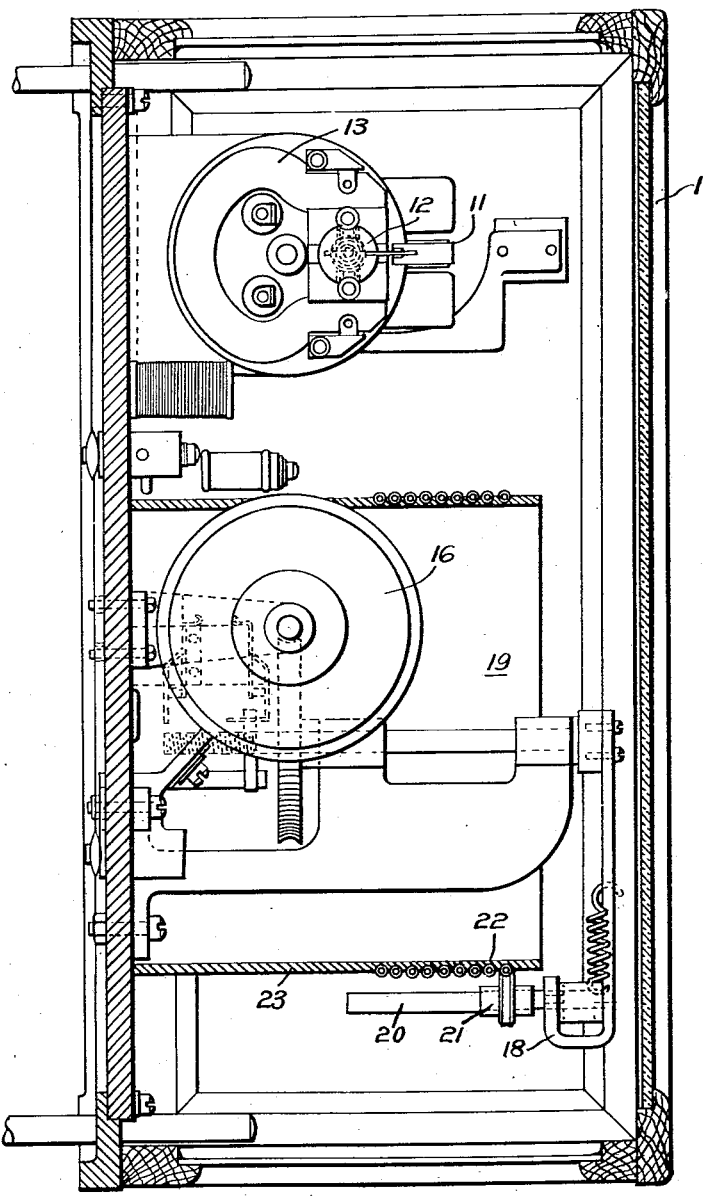
Fig. 2 is a side view, partially in section and partially in elevation, of the instrument shown in Fig. 1.

The instruments 1 and 2 may be constructed as shown in Figs. 1 and 2 of the drawings. Each instrument comprises a Kelvin-balance wattmeter 7 having stationary and movable coils 8 and 9. The movable coils 9 are pivotally mounted at 10. An extension or arm 11 is secured to the movable coils 9 and to a movable element 12 of a D'Arsonval instrument 13. (See Fig. 2.) A movable contact member 14 secured to the movable coils 9 of the Kelvin-balance co-operates with stationary contact members 15 supported by the bracket 24 on the frame of the instrument. The contact members 14 and 15 control the circuit of a motor 16 that is connected through suitable reduction gearing 17 to the movable contact arm 18 of a variable resistor 19. The arm 18 of the variable resistor is provided with a laterally projecting rod 20 having a contact member 21 freely journaled thereon to rotate and to slide back and forth as required. The contact member 21 is adapted to engage the convolutions of a coiled resistor 22 that is helically wound upon a cylindrical supporting member 23.

The resistor 22 is connected in series with the movable coil 12 of the D'Arsonval instrument 13 to control the current therethrough. The Kelvin-balance wattmeter 7 is connected to measure the power or the reactive component of the volt-amperes flowing in an alternating-current circuit. As the power or the reactive component varies, the torque on the movable element of the Kelvin-balance varies and the movable contact member 14 engages one of the stationary contact members 15. The motor 16 is energized and rotates in a direction that depends upon which of the stationary contacts 15 has been engaged by the movable contact member 14. Therefore, the movable contact member 21 of the variable resistor 19 is operated by the motor 16 in such a direction that the current through the D'Arsonval instrument 13 is increased or decreased sufficiently to balance the torque of the Kelvin-balance wattmeter 7 and to return the contact member 14 to a central position out of engagement with either of the stationary contact members.

Since the current through the instrument 13 is proportional to the power or reactive component that is being measured by the Kelvin-balance instrument 7, this current may be used to energize one winding of the receiving instrument 6 in accordance with one component of the volt-amperes, as indicated in Fig. 3. The instrument 2 is similar to the instrument 1 and is adapted to be similarly connected to the instrument 6 to energize its other windings with the other component of the volt-amperes. The receiving instrument 6 may be a dynamometer instrument of any type having two sets of windings that may be connected in series with the circuits 4 and 5. I prefer to use an instrument of the Kelvin-balance type, however, as graphic instruments of this type are available that are sensitive and accurate. The detailed construction of an instrument suitable for the purpose is disclosed in United States Patent No. 1,031,041 to Frank Conrad et al. The torque on each of the elements of the Kelvin-balance instrument 6 being proportional to the square of the current therein, the stylus of the instrument is actuated in proportion to the sum of the squares of the power and the reactive components of volt-amperes flowing in the circuit 3. The instrument 6 may be calibrated to read volt-amperes directly, this quantity being ordinarily defined as the square root of the sum of the squares of the power and the reactive components.

In Fig. 4 is shown a modification of my invention in which current-impulse transmitting devices are employed. The instruments 1 and 2 are connected to an alternating-current circuit 3 to be actuated in accordance with the power and the reactive components of the volt-amperes flowing in the circuit as before. However, the instruments 1 and 2 are polyphase watthour meters with the rotatable element thereof provided with commutators 26 controlling impulse relays 27 at the receiving station. The commutators 26 intermittently make and break the circuits of the impulse relays 27 at rates that are proportional to the power and the reactive components of the volt-amperes flowing in the circuit 3. A condenser 28 and a battery 29 are connected in series with contact members of the relays 27 and the respective current elements of the Kelvin-balance instrument 6.

As the relays 27 operate, the condensers 28 are charged and discharged through the windings of the instrument 6. Since the capacity of the condensers is fixed and the batteries 29 are of constant potential, the average values of the currents flowing through the windings of the meter 6 are proportional to the rates at which relays 27 operate, which are proportional to the quantities measured by the watthour meters 1 and 2. Therefore, the instrument 6 is actuated in accordance with the sum of the squares of the power and the reactive components and may be calibrated to read volt-amperes. As in the system shown in Fig. 3, the operation is independent of changes of resistance of the circuits 4 and 5 and therefore, the indication may be transmitted over relatively great distances, if desired.

In Fig. 5 is shown a further modification of my invention, in which a Kelvin-balance 6 is actuated in accordance with the total volt-amperes in two alternating-current circuits.

Suitable means similar to that shown in either Fig. 3 or Fig. 4 is provided for measuring the power and reactive components of the volt-amperes traversing each circuit, and for producing currents in the circuits 4ᵃ, 4ᵇ, 5ᵃ and 5ᵇ proportional to these components. The circuits 4ᵃ and 4ᵇ traversed by currents proportional to the reactive component are connected in parallel to one element of the Kelvin-balance 6, which is therefor energized in accordance with the sum of these currents. The other circuits 5ᵃ and 5ᵇ are connected in parallel to the other element of the Kelvin-balance. Accordingly, the torque on the Kelvin-balance is proportional to the square of the total volt-amperes in the plurality of associated circuits.

A Kelvin-balance 30 is mechanically connected in opposition to the Kelvin-balance 6. The Kelvin-balance 30 is provided with contact members 31 adapted to control the operation of a motor 32 in the usual manner to vary the resistance of the circuit connected to the balance 30 to restore the system to a balance. The current flowing in the circuit 33 that is required to balance the torque of the Kelvin-balance 6 is proportional to the total volt-amperes flowing in the alternating-current circuits associated therewith. Accordingly, an instrument 34, which may be an ordinary direct-current meter or relay, is actuated in accordance with the total volt-amperes flowing in the circuits connected to the balance 6. By the use of this arrangement, the volt-amperes of a plurality of alternating-current circuits may be totalized in a relatively simple manner.

I am aware that many changes in the arrangements shown and described may be made within the scope of my invention. Therefore, I do not wish to be limited in scope except as may be indicated in the appended claims.

I claim as my invention:

1. A remote metering system for an alternating-current circuit comprising two instruments actuated in accordance with the power and reactive components, respectively, of the volt-amperes flowing in said circuit, means including said instruments for producing currents varied in accordance with said components at a remote point, and a device at said remote point responsive to said currents and actuated in accordance with a function of the volt-amperes traversing said circuit.

2. A remote metering system for an electrical circuit comprising a wattmeter, a reactive volt-ampere meter, two transmission circuits associated with said meters, means including said meters for varying the currents in said transmission circuits in accordance with the measured watts and reactive volt-amperes, and an instrument associated with said transmission circuits to be actuated in accordance with a function of the volt-amperes traversing the electrical circuit.

3. A remote metering system comprising two circuits, means including a measuring device for producing electrical currents of a predetermined character in each circuit in accordance with two different electrical quantities, and an indicating instrument associated with the circuits and actuated in accordance with a function of the instantaneous values of both said quantities.

4. A measuring instrument comprising a Kelvin-balance having two windings, means for causing currents to traverse said windings that are proportional to the power and the reactive components, respectively, of volt-amperes traversing a circuit, and means for balancing the torque of said balance and for indicating the value of the measured volt-amperes traversing the circuit.

5. A remote metering system for an electrical circuit comprising means for producing electrical currents having a characteristic proportional to the power and the reactive components of volt-amperes traversing the circuit, respectively, and a Kelvin balance having windings so energized by said currents as to be actuated in accordance with a function of the volt-amperes traversing said circuit.

6. A remote metering system comprising current-impulse devices operating in accordance with the power and reactive components of the volt-amperes traversing a circuit, respectively, relays controlled thereby and a Kelvin balance having a winding intermittently energized by each relay.

7. A remote metering system comprising current-impulse devices operating in accordance with the power and reactive components of the volt-amperes traversing a circuit, respectively, relays controlled thereby, condensers associated with said relays, a Kelvin balance having a plurality of windings and means including said relays for charging and discharging said condensers through the windings of said balance.

8. In combination, means for producing two electrical currents corresponding to the power and reactive components of the volt-amperes traversing a circuit, respectively, a Kelvin balance energized by said currents, an opposing instrument connected to said balance and means for controlling the current through said instrument to maintain the balance in equilibrium.

9. In combination, means for producing two electrical currents corresponding to the power and reactive components of the volt-amperes traversing a circuit, respectively, a Kelvin balance energized by said currents, an opposing instrument connected to said balance, means for controlling the current through said instrument in accordance with the operation of said balance and an electro-responsive device in series with said opposing instrument.

In testimony whereof, I have hereunto subscribed my name this 12th day of November, 1924.

PERRY A. BORDEN.